(No Model.)
W. H. HOBSON.
HARROW ATTACHMENT FOR CULTIVATORS.
No. 349,795. Patented Sept. 28, 1886.
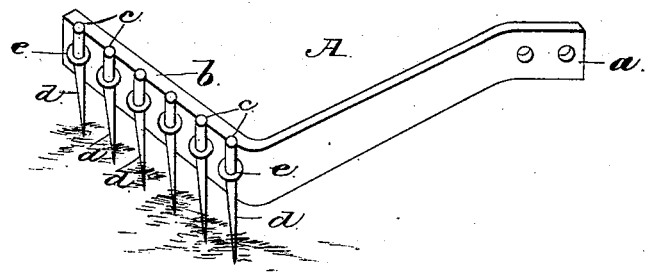
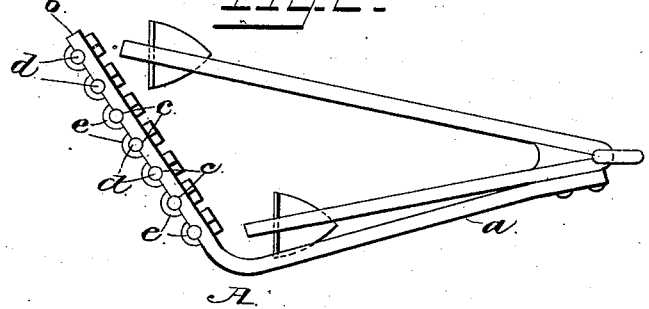
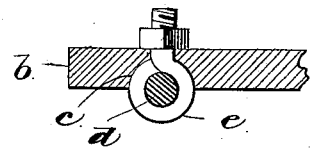
Witnesses
M. E. Fowler
J. W. Garner
Inventor
W. H. Hobson
By his Attorneys
C. A. Snow & Co.

UNITED STATES PATENT OFFICE.

WILLIAM HENRY HOBSON, OF LAMONTE, MISSOURI.

HARROW ATTACHMENT FOR CULTIVATORS.

SPECIFICATION forming part of Letters Patent No. 349,795, dated September 28, 1886.

Application filed January 4, 1886. Serial No. 187,587. (No model.)

*To all whom it may concern:*

Be it known that I, WILLIAM HENRY HOBSON, a citizen of the United States, residing at Lamonte, in the county of Pettis and State of Missouri, have invented a new and useful Improvement in Harrow Attachments for Cultivators, of which the following is a specification, reference being had to the accompanying drawings.

My invention relates to an improvement in harrow attachments for cultivators; and it consists in the peculiar construction and combination of devices, that will be more fully set forth hereinafter, and particularly pointed out in the claims.

The object of my invention is to provide a harrow attachment for a cultivator, whereby the plants will be cultivated and cleared of weeds at the same time, and clods and stones prevented from rolling on the plants and crushing them.

In the drawings, Figure 1 is a detached perspective view of my improved attachment. Fig. 2 is a top plan view of a cultivator with my improved harrowing attachment applied thereto. Fig. 3 is a detailed transverse sectional view taken through the oblique arm of the attachment, and showing the method of attaching the harrow-teeth thereto.

A represents the harrow attachment, which is composed of a metallic bar bent in the form shown to form an arm, $a$, to be attached to the beam of the cultivator, and the oblique harrow beam or arm $b$, which runs diagonally to the line of draft and in rear of the cultivator-shovels, as shown in Fig. 2. On one side of the beam $b$ is made a series of grooves, $c$, which may be either vertical or inclined, accordingly as it is desired the harrow-teeth shall run, and in these grooves are secured harrow-teeth $d$ by means of hooked bolts $e$, the shanks of which extend transversely through the beam $b$, and have nuts $f$, screwed onto their threaded outer ends, as shown at Fig. 3. By means of these hooked bolts the harrow-teeth may be secured at any desired vertical adjustment, thus adapting the teeth to run in the ground at any suitable depth, in order to thoroughly stir the soil and clear it of weeds and to suit other varying conditions.

In Fig. 2 I have shown the harrow attachment applied to a double-shovel walking-cultivator of the common form for convenience in illustration; but it will be readily understood that my invention is adapted to be attached also to the common form of sulky-cultivators having two beams each provided with two cultivator-shovels, and that one or more of my attachments may be applied to each beam thereof.

The beam $b$ runs at a slight distance above the ground, and serves as a fender to prevent clods and stones which are too large to pass between the harrow-teeth from rolling on the young plants that are being cultivated and crushing them.

Having thus described my invention, I claim—

1. The combination, with a cultivator, of the diagonally-arranged beam having the harrow-teeth, and secured to the cultivator and working in rear of the shovels thereof, for the purpose set forth, substantially as described.

2. The combination, with a cultivator, of the diagonally-arranged beam having the harrow-teeth, and the arm $a$, for securing it to one of the beams of the cultivator, the said arm $a$ extending forwardly and upwardly at an angle to the beam, whereby the teeth of the latter will run in rear of the shovels or plows, substantially as described.

In testimony that I claim the foregoing as my own I have hereto affixed my signature in presence of two witnesses.

WILLIAM HENRY HOBSON.

Witnesses:
JOS. H. KINKEND,
A. BRUMLEY.